United States Patent [19]

Tichenor

[11] Patent Number: 4,470,747
[45] Date of Patent: Sep. 11, 1984

[54] SEPARATED DISCARDS CARRIER WITH SAFETY FEATURES

[75] Inventor: Richard L. Tichenor, Portsmouth, N.H.

[73] Assignee: Recycling & Conservation, Inc., Kittery, Me.

[21] Appl. No.: 451,250

[22] Filed: Dec. 20, 1982

[51] Int. Cl.³ .............................................. B65F 3/08
[52] U.S. Cl. .................................... 414/491; 414/541; 414/639; 298/8 R; 298/13
[58] Field of Search ............... 414/491, 541, 639, 640; 298/10, 18, 8 R, 12, 13; 105/269

[56] References Cited

U.S. PATENT DOCUMENTS

| | | | |
|---|---|---|---|
| 880,548 | 3/1908 | Lloyd | 105/269 |
| 2,961,977 | 11/1960 | Coleman | 414/540 X |
| 3,099,489 | 7/1963 | Johnson | 105/269 X |
| 4,056,185 | 11/1977 | Cartwright | 198/861 X |
| 4,119,222 | 10/1978 | Kaarnametsa | 298/8 R X |
| 4,174,725 | 11/1979 | Lapere | 251/294 X |
| 4,425,070 | 1/1984 | Howells et al. | 414/542 X |

FOREIGN PATENT DOCUMENTS 311642 8/1916 Fed. Rep. of Germany ...... 105/269

OTHER PUBLICATIONS

Description of Separated Discards Carrier, 5-1978.

Primary Examiner—Joseph E. Valenza
Assistant Examiner—Stuart Millman
Attorney, Agent, or Firm—Pearson & Pearson

[57] ABSTRACT

A motorized vehicle has an elongated space between a drivers cab at the front and a garbage compactor at the rear, one side of the space being occupied by a glass collection bin and a can collection bin. The other side of the space is occupied by a newspaper receptacle, between a glass hopper and a can hopper. The collection bins move several feet laterally and then tilt to dump away from the side of the vehicle. The paper receptacle tilts to discharge. The hopper and vertical conveyors are enclosed and the conveyors cannot move unless the access doors are closed. All actuations are hydraulically powered with "dead man" safety control valves.

6 Claims, 6 Drawing Figures

SEPARATED DISCARDS CARRIER WITH SAFETY FEATURES

CROSS REFERENCE TO RELATED APPLICATION

This application relates to an improvement in Separated Discards Carriers as disclosed in Ser. No. 035,802 filed June 14, 1979 now U.S. Pat. No. 4,425,070, and is owned by a common assignee.

BACKGROUND OF THE INVENTION

It has heretofore been proposed in the above mentioned U.S. Pat. No. 4,425,070 to elongate the frame of a motor vehicle and thereby establish an elongated central space between the driver's cab, at the front, and a conventional garbage compactor, at the rear. Instead of discarding newspapers, metal cans, and glass bottles for destruction in the compactor, these discards were arranged to be separated by the householder at curbside and separately carried in the vehicle for collection in separate piles at a collection depot.

The elongated space on the carrier was provided with a large collection bin for glass, and a large collection bin for cans both on one side of the space, these being emptied by being rollably offloaded laterally from the truck when filled. The newspaper receptacle was also completely offloaded laterally from the truck by a hoist. The can hopper and glass hopper and the vertical conveyors which dumped their contents in their respective bins from curbside level were completely exposed so that the operators could be injured by the rising or falling hoppers.

It has been proposed in U.S. Pat. No. 2,961,977 to Coleman of Nov. 29, 1960 to provide refuse and garbage disposal apparatus in which the material is compacted by a downward press platen in a collection bin, the bin is hinged to tilt outwardly, the outer wall hinge pivots outwardly and the bin is tipped outwardly by an elevator ram below the bin to discharge the bin alongside the truck.

SUMMARY OF THIS INVENTION

In this invention, the separated discards carrier now includes important safety features to prevent injury to untrained or inexperienced operators who may be placed in charge of this curbside collection vehicle with it's powerful compacting, hopper elevating, bin dumping and rack discharging mechanisms.

All recyclables side load on the right side of the truck. The newspaper container also discharges from the right side of the truck. The glass and can containers discharge from the left side of the truck. Mixed refuse is both loaded and discharged at the rear of the truck.

There are four openings on the right side through which recyclable materials can be deposited into the vehicle. Materials deposited in the two outer openings go into receiving hoppers which are intended for items such as bottles and cans. Each of these hoppers has a capacity of approximately seven cubic feet. When either hopper is full, it is raised hydraulically to the top of the vehicle where it engages a hydraulically powered rotary actuator which tips the hopper, dumping the contents into the large storage container. After a short delay, determined by an adjustable timer, all motions reverse automatically and the hopper returns to its receiving position. The vertical path of each hopper is enclosed to prevent the operator from being under the hopper during its descent. As an additional safety precaution against arms being extended into the enclosure, there are sliding doors on the opening for each hopper. A hopper cannot be activated unless the door on its enclosure is in the closed position, and its motion will be stopped if the door is opened at any point during its operation.

The large containers, or bins, into which the hoppers dump their contents, are on the left side of the vehicle. When the vehicle returns to the recycling center, these containers are also dumped hydraulically. The dumping motion occurs in two stages. In the first stage, the containers move two feet horizontally so that the contents will not be dumped immediately adjacent to the truck. With the container in this position, the operator opens the discharge doors by inserting a special "key" into a lock which is located on the side of the container so the operator will not be struck by the materials which discharge when the doors swing open. Any materials which do not discharge when the doors are opened with the container in the horizontal position are emptied by the second stage motion which is the tipping of the container. Both the horizontal and the tipping motions are activated by hydraulic valves which stop those motions at any time the operator releases the activating lever on those valves.

The storage for newspaper (or similar material) is located on the right side of the truck between the glass and can receiving hoppers described above. Material deposited in either of the two center openings in the right side of the recycling module is being placed directly into this container. Much of the container capacity is above these openings, but the entire container can be filled from this convenient height because the container is compartmentalized by means of a smaller interior container. This interior container which occupies a little over half of the space in the large container is initially in the bottom section of the outer container. When it is in that position, material deposited through the openings is going into the interior container. When it is full, it is raised hydraulically to the top section of the outer container. The bottom section of the outer container is then filled through the same receiving openings. The openings can be closed by means of sliding doors located above and below each opening. The doors below each opening can also be raised in stages as a compartment is being filled to prevent paper already in the compartment from falling out during the loading process.

As indicated above, material entering the newspaper container through either opening goes into the same compartment. There are two openings rather than a single large opening because the front of the container is constructed as two separate sections formed by two large doors which open from the center of the container to allow discharge of the container contents. When the vehicle reaches the recycling center, the large doors are opened and the container is hydraulically tipped to empty the contents. Both this tipping motion and the raising and lowering of the interior compartment are actuated by the same type of "dead man" controls described above for both movements of the other storage containers for glass and cans.

DESCRIPTION OF A PREFERRED EMBODIMENT

Figure 1:
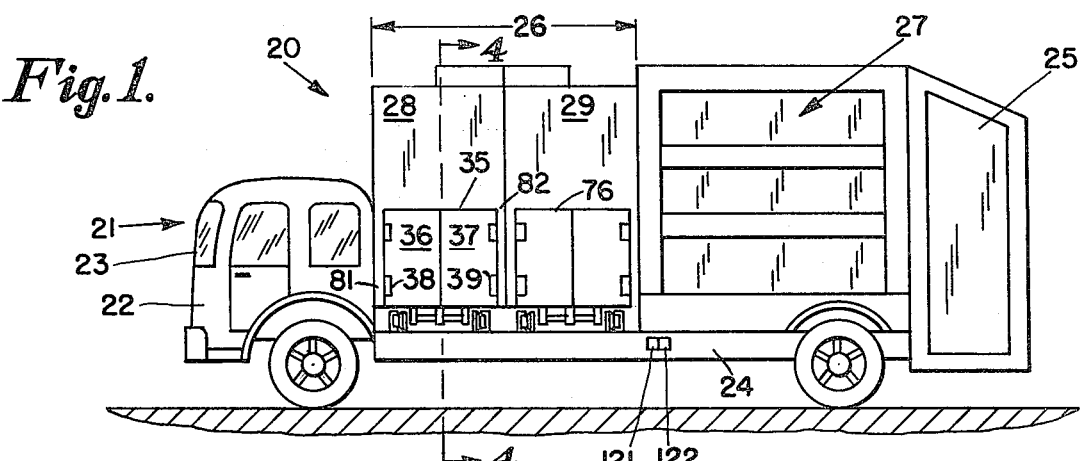
FIG. 1 is a side elevation of the separated discards carrier of the invention from the left side.
Figure 2:
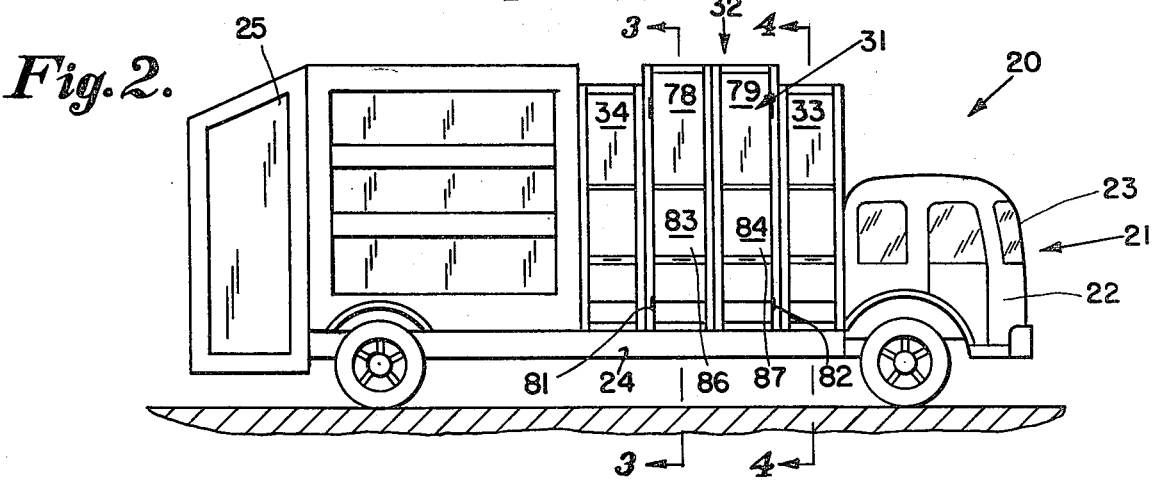
FIG. 2 is a view, similar to FIG. 1 of the right side of the carrier.
Figure 3:
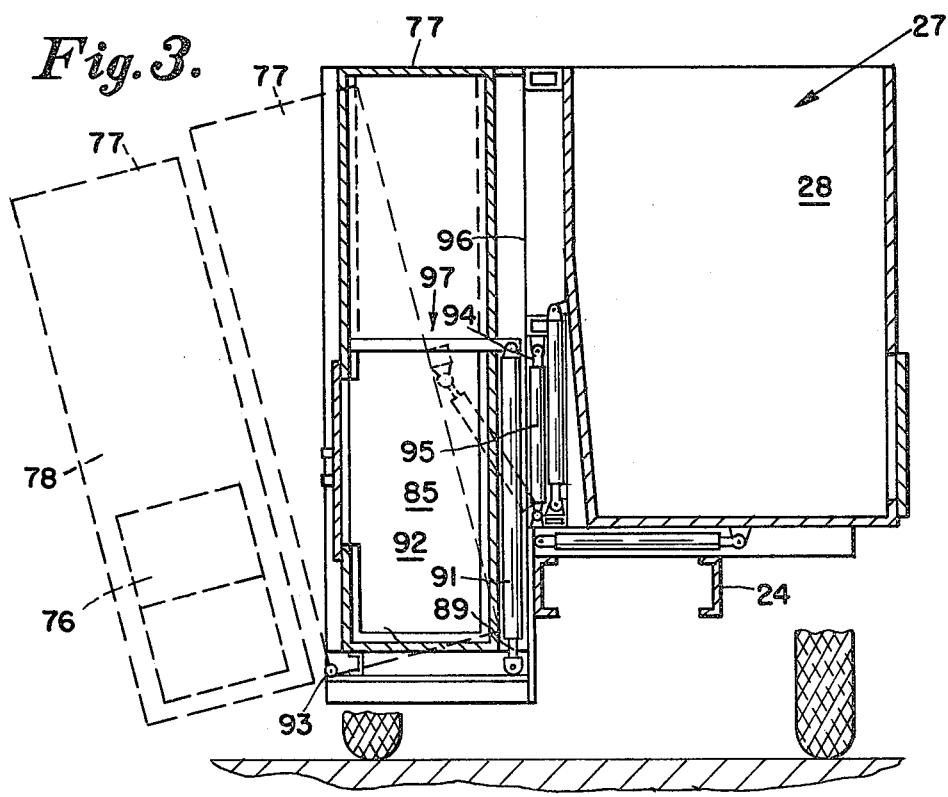
FIG. 3 is an enlarged rear elevational view, in section on line 3—3 of FIG. 2 showing the newspaper receptacle and elevator mechanism diagramatically.

The separated discards carrier 20 of this invention includes a vehicle 21 having a motor 22, drivers cab 23, frame 24 and trash and garbage compactor 25. The frame 24 has been elongated to provide the elongated space 26, between cab 23 and compactor 25, the space 26 being occupied on one side, 27 namely the left side, by the metal can collection bin 28 and by the adjacent glass collection bin 29. The other side, or right side 31, of the elongated space 26 is occupied by the newspaper receptacle 32, which is located between the can hopper enclosure 33 and the glass hopper enclosure 34.

Figure 4:
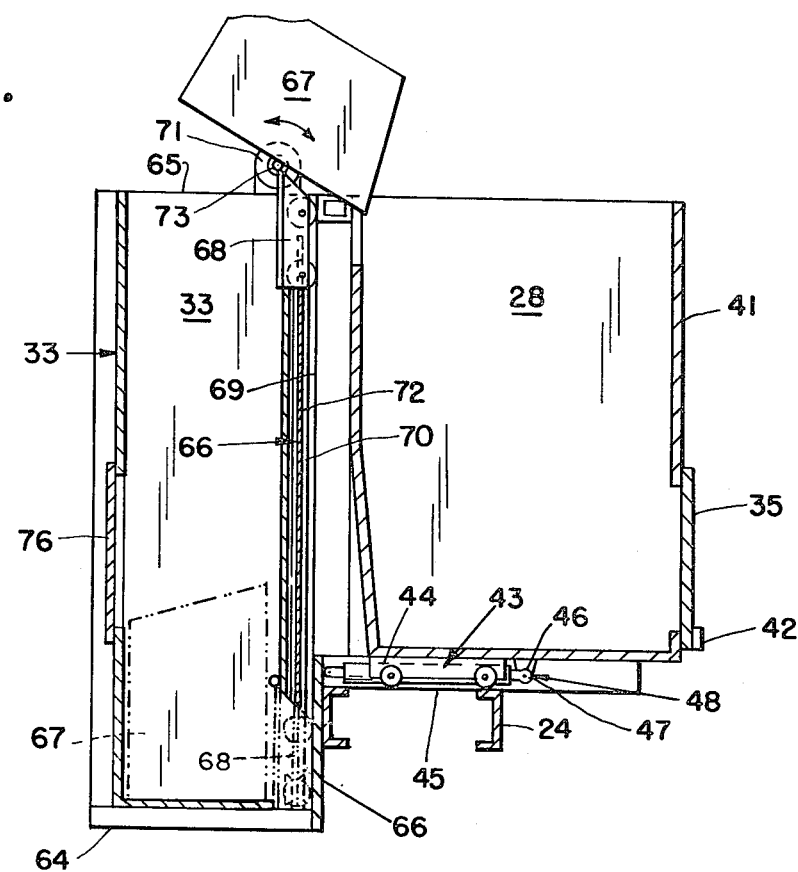
FIG. 4 is an enlarged, rear, elevational view, in section on line 4—4 of FIG. 2 showing the hopper, conveyor and collection bin mechanism diagramatically.
Figure 5:
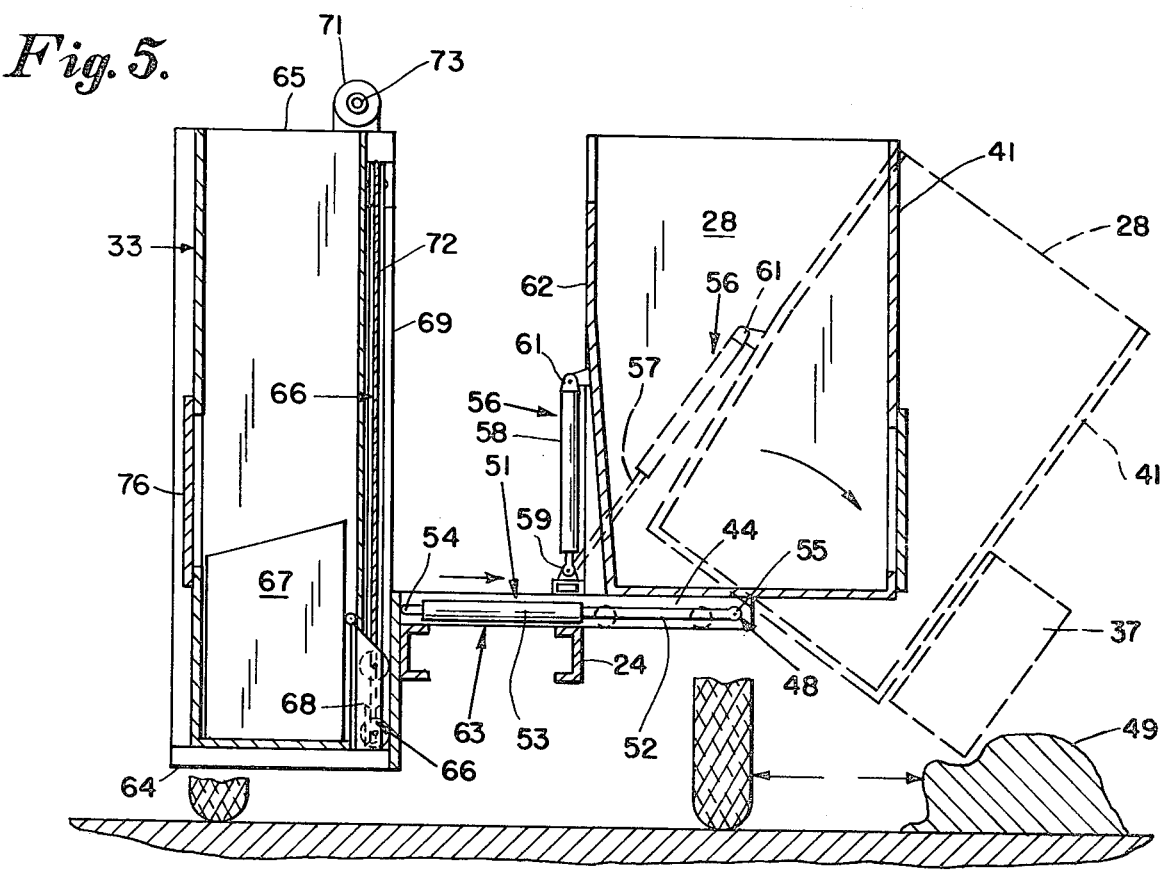
FIG. 5 is a view similar to FIG. 4 showing the carriage means translated laterally, and the bin tilted outwarded with the bin closures unlatched and open to discharge the contents at a spaced distance away from the side of the carrier.

The collection bins 28 and 29 are identical in structure and operation so that only the can collection bin 28 is described and illustrated in detail, herein, it being understood that the glass bin 29 structure and operation is the same. As shown in FIGS. 4 and 5, can bin 28 is provided with a closure 35, preferably in the form of a pair of doors 36 and 37, each mounted to pivot outwardly on vertical hinges 38 and 39 in the outside wall 41 of the bin and normally held closed by the releasable latch 42.

Each bin 28 or 29 is supported on carriage means such as 43, preferably in the form of a low, wheeled carriage 44 movable laterally in tracks 45 on frame 24, each bin having its lower front edge 46, connected to the front edge 47 of carriage Each bin 28 or 29 is supported on carriage means such as 43, preferably in the form of a low, wheeled carriage 44 movable laterally in tracks 45 on frame 24, each bin having its lower front edge 46, connected to the front edge 47 of carriage 44 by horizontal, longitudinally extending hinge means 48.

Each carriage means 43 thus supports its bin 28 or 29, for lateral translatory movement relative to frame 24, to a dumping location 49, spaced several feet away from the side of the carrier 20, so that the bin can be partially discharged when the doors 36 and 37 are unlatched and opened, and fully discharged when the bin is tilted outwardly at the dumping location 49. (FIG. 5)

First power means 51 is provided on vehicle 21 comprising an hydraulic piston rod 52 and cylinder 53 having one end 54 connected to frame 24, and thence extending horizontally with the other end 55 connected to the carriage 44 (FIG. 5).

Second power means 56 is provided on each carriage 44 and comprising an hydraulic piston rod 57 and cylinder 58 having one end 59 connected to the carriage and thence extending upwardly at a slight angle to the other end 61 which is connected to the rear, or inner, wall 62 of the bin 28, or 29, on the carriage, (FIG. 5).

Upon the application of fluid under pressure, by the operator actuatable control means 63 of the invention, to each cylinder 53, each bin 28 or 29 is moved laterally outwardly on its carriage 44, to the dumping location 49.

The pressurized fluid is then applied to cylinder 58 to tilt the bins outwardly for full discharge of the contents at the dumping location. Pressurized fluid is then applied to the other side of the respective piston heads to reverse the process and return the bins and carriages to their original positions on the carrier.

The other, or right side 31, of the space 26 contains the can hopper enclosure 33 and the glass hopper enclosure 34, each on an opposite side of the newspaper receptacle 32, and since the enclosures are identical in structure and operation, only one will be described and illustrated in detail herein.

As shown in FIG. 4, in half section, the can hopper enclosure 33, extends vertically from curbside level 64 to the level 65 of the top of the bins 28 or 29, and completely encloses the conveyor means 66 which moves the can hopper 67 in a vertical path upwardly and downwardly within the enclosure. Each hopper 67, is carried on a vertically movable, wheeled carriage 68, movable in vertical tracks such as 69 by an hydraulic motor 71 and the endless cable 72, of a "Toolamatic" cable cylinder 70 the hopper being tilted at the top of its travel by a hydraulically powered rotary actuator 73 which tilts the hopper to dump the contents into the bin 28. After a predetermined time delay, controlled by adjustable timer 74, the hopper is returned to its normally upright position and lowered to its normal curbside level position where it may again be filled through the slidable access doors 76.

The hopper and conveyor means cannot be activated unless the doors 76 are closed, thereby assuring that the operator will not catch his arms in the hopper mechanism or be struck by falling cans or bottles or by the moving hopper. Opening the doors 76, stops all motion of the hopper.

The newspaper receptacle 32 comprises a main, full height, box-like enclosure 77, having a pair of doors, 78 and 79 hinged at opposite side edges 81 and 82, each door having a sliding closure 83 or 84 for receiving newspaper. Inside the receptacle 32 is an inner, lower, half-height, elevator 85, normally positioned at the bottom of the main enclosure 77 and which receives the first newspapers introduced into the access openings 86 or 87 at the closures 83 and 84.

When the elevator 85 is filled, the operator presses a valve 88 which causes a piston rod 89, to slide upwardly under hydraulic pressure in a cylinder 91, to lift the elevator 85 to the top of the inside of the main box-like enclosure 77 so that the lower portion 92 thereof may be filled.

The enclosure 77 is pivoted at its outer lower edge 93 to the carrier 20 and connected by a piston rod 94 and cylinder 95, between rear wall 96 and the carrier 20 so that the doors 78 and 79 may be opened and the receptacle 32 outwardly tilted to discharge the newspapers alongside the carrier 20. The piston rod 94 and cylinder 95 are designated the third power means 97 herein.

Figure 6:
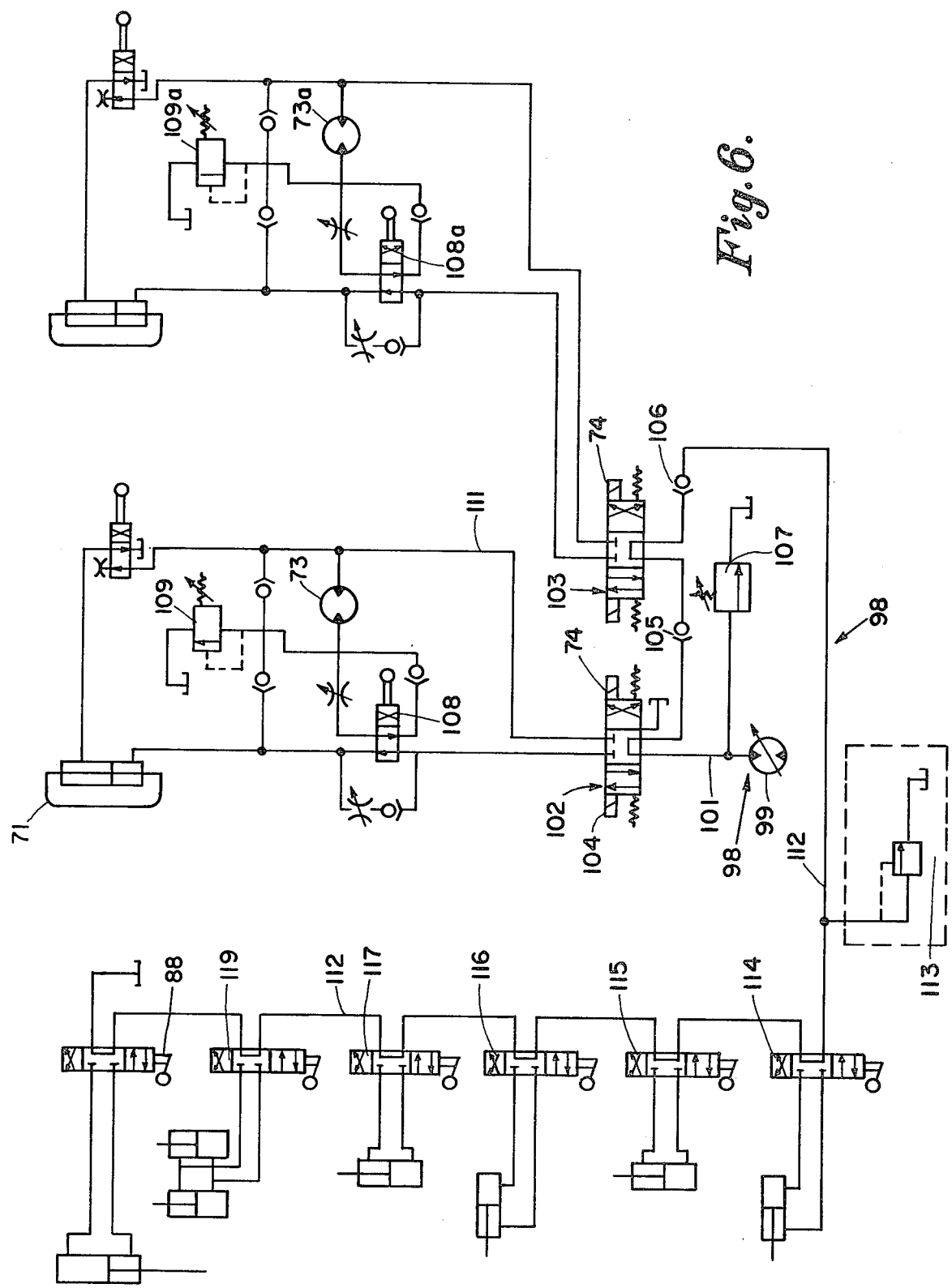
FIG. 6 is an hydraulic circuit diagram showing the various valve controls for the various hydraulic power actuators of the invention.

In FIG. 6, the hydraulic circuitry of the invention is shown in conventional hydraulic symbols, all of the hydraulic valve, manual, controls being located in appropriate locations on the carrier and including three way position valves forming the operator actuatable control means 98 of the invention.

Control means 98 includes the hydraulic pump 99, connected by hose 101 to the solenoid actuated three-way valves 102 and 103, each having timer 74 or 104, a check valve 105 or 106 and there being a pressure relief valve 107.

108 is a cam actuated valve which turns off and on the flow to the "Ohio Oscillator", which is the hydraulic rotary actuator 73 for tipping the can hopper, valve 108 acting as a limit switch in the path of the hopper 67. The Ohio Oscillator operates at about 2000 psi. Hose 101 also leads to the "Toolamatic" device which serves as the hydraulic motor 71 for raising the hopper 67 on it's carriage 68, in it's tracks 69, this motor operating at about 500 psi. A relief valve 109 is provided in this sub-circuit, as is a return hose 111.

The glass hopper hydraulic circuit is identical to the above described circuit and the numerals designating the components each include an "a".

The bins 28 and 29 and their wheeled carriages such as 44 are actuated by a pressure line 112 having a pressure relief valve 113 on the valve switch banks located on the right side of the vehicle and consisting of three-way valves 114 for rolling out the glass bin to the dumping location, 115 for dumping the glass bin, 116 for rolling out the can bin to the dumping location and 117 for dumping the can bin. Three way valve 88 applies pressure to raise the elevator 85 of the newspaper receptacle 32 and three-way valve 119 applies pressure to tilt the receptacle 32 outwardly to discharge the contents. The three-way valves of the circuit all having an "advance", "neutral" and "retract" position.

The three-way valves 114, 115, 116, and 117 are located on the carrier, but at a spaced distance alongside their respective bins, and preferably include a special key 121 and a special lock 122, so that only authorized personnel can cause roll out and tilt of the bins and to avoid the danger of anyone being in the path of the bins during discharge.

I claim:

1. A separated discards carrier of the type comprising a conventional trash and garbage compactor vehicle, with an elongated space between cab and compactor, for a can bin and a glass bin on one side of said space, and for a newspaper receptacle between a can hopper means and a glass hopper means on the other side of said space, said bins each having an outside wall and an inner wall, and a hinged, latched, outside wall closure for discharging the contents thereof, said carrier characterized by:

carriage means on said vehicle supporting said bins for lateral movement to a dumping location at a spaced distance away from the side of said vehicle;
    first power means, on said vehicle, operably connected to said carriage means for moving said bins to said dumping location;
    second power means on said carriage means, operably connected to said bins for tilting said bins into inclined discharge position at said dumping location;
    said carriage means including a pair of horizontally movable wheeled carriages, one supporting each bin and said second power means includes a pair of hydraulic pistons and cylinders, each having one end pivoted to one of said carriages and thence extending upwardly to an opposite end pivoted to the inner wall of the bin supported on that carriage;
    and operator actuatable control means, remote from said dumping location, for actuating said first and second power means and unlatching the outside wal closures on said bins to laterally translate, outward tilt and discharge said bins.

2. A separated discards carrier as specified in claim 1 wherein:
    said operator actuatable control means are each hydraulic control valves, actuated by a special key in locks mounted on said vehicle, remote from said bins, so that the operator will not be struck by the materials discharged from said bins.

3. A separated discards carrier as specified in claim 1 wherein:
    each said can hopper means and glass hopper means includes a vertical track extending from curbside level to the level of the top of said bins, a vertically movable wheeled carriage guided on said track, a hopper pivotally mounted on said carriage to tilt into a bin, when reaching the top of said track, a rotary actuator at the top of said track to tilt said hopper and conveyor means for raising and lowering said wheeled carriage and hopper on said track.

4. A separated discards carrier as specified in claim 3 wherein:
    each said can hopper means and glass hopper means includes a vertical enclosure extending upwardly from curbside level to the level of the top of said bins and completely enclosing said means, each said enclosure having slidable access doors at curbside level to give access to the hopper therewithin;
    and control means, actuated by the open or closed position of said doors, for starting or stopping said conveyor means;

5. A separated discards carrier as specified in claim 3 wherein:
    each said conveyor means includes an endless cable powered by an hydraulic motor the vertically movable wheeled carriage thereof being affixed to said cable; and
    each said conveyor means includes an adjustable timer which, after a short delay, reverses all motions to return each hopper to its receiving position at curbside level within its enclosure.

6. A separated discards carrier as specified in claim 1 wherein;
    said newspaper receptacle includes an inner, lower, elevator movable from the lower to the upper portion of the receptacle when filled;
    a pair of full height doors on said receptacle, each hinge pivoted to open outwardly, each having an opening, and each having a sliding closure covering the opening, for receiving newspapers
    a hinge pivot connection to said vehicle at the outer lower edge of said receptacle for outward tilting of said receptacle and
    third power means on said vehicle, operably connected to the rear wall of said receptacle for tilting it outwardly on said hinge pivot connecton to discharge the newspapers in said receptacle and elevator.

* * * * *